Aug. 30, 1932.  D. N. CROSTHWAIT, JR  1,874,911
FREEZING TEMPERATURE INDICATOR
Filed Aug. 25, 1928  2 Sheets-Sheet 1
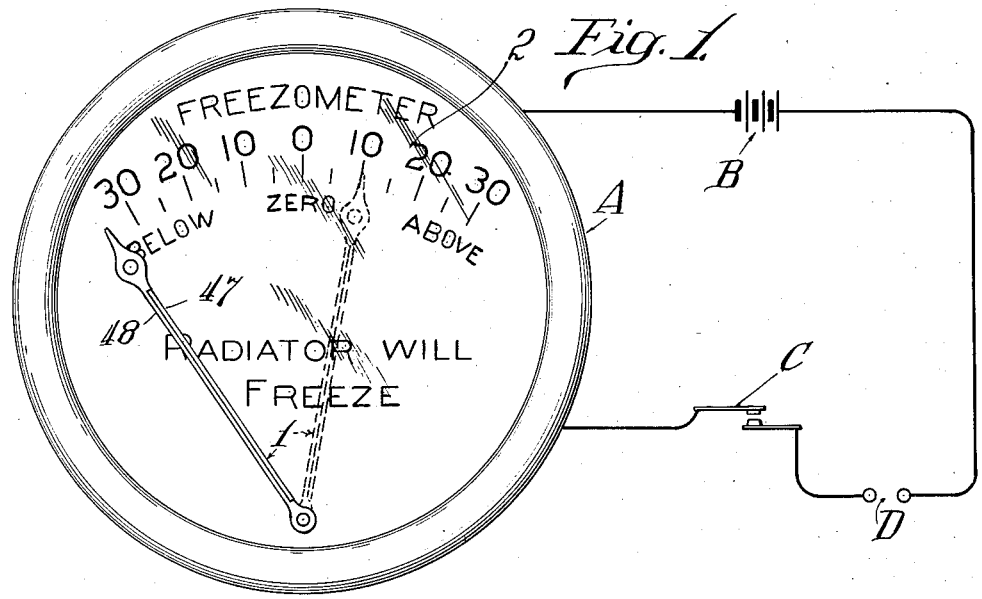
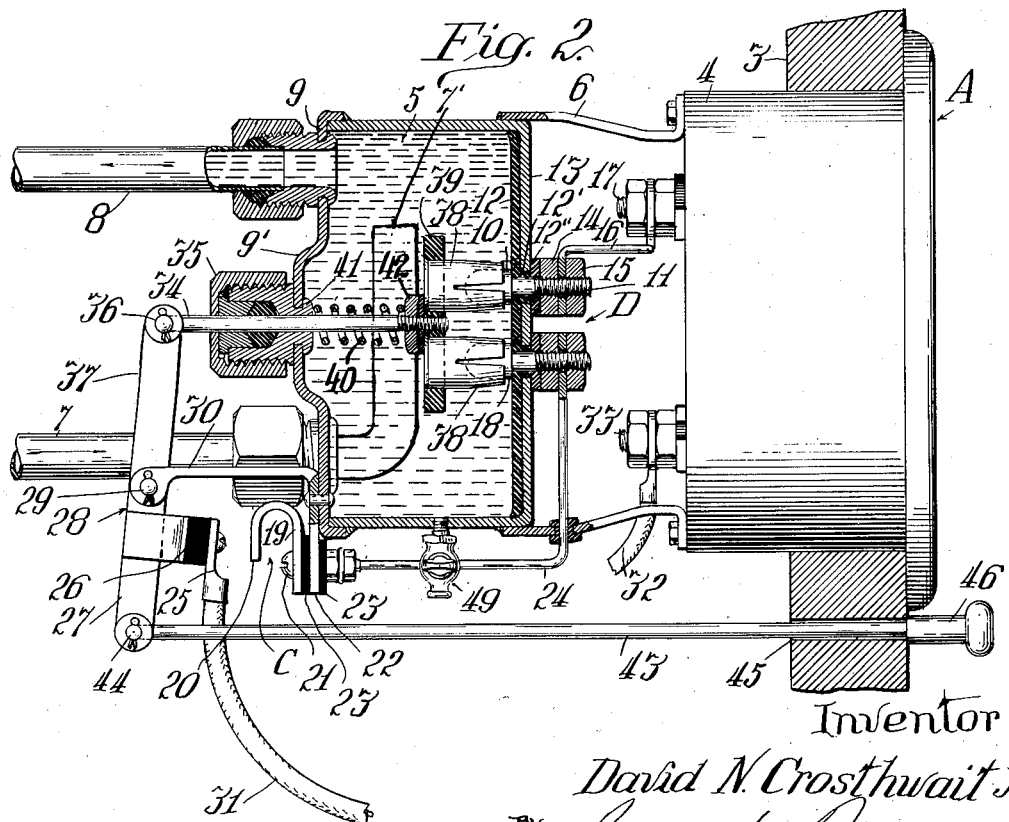
Inventor
David N. Crosthwait Jr.
Attorneys.

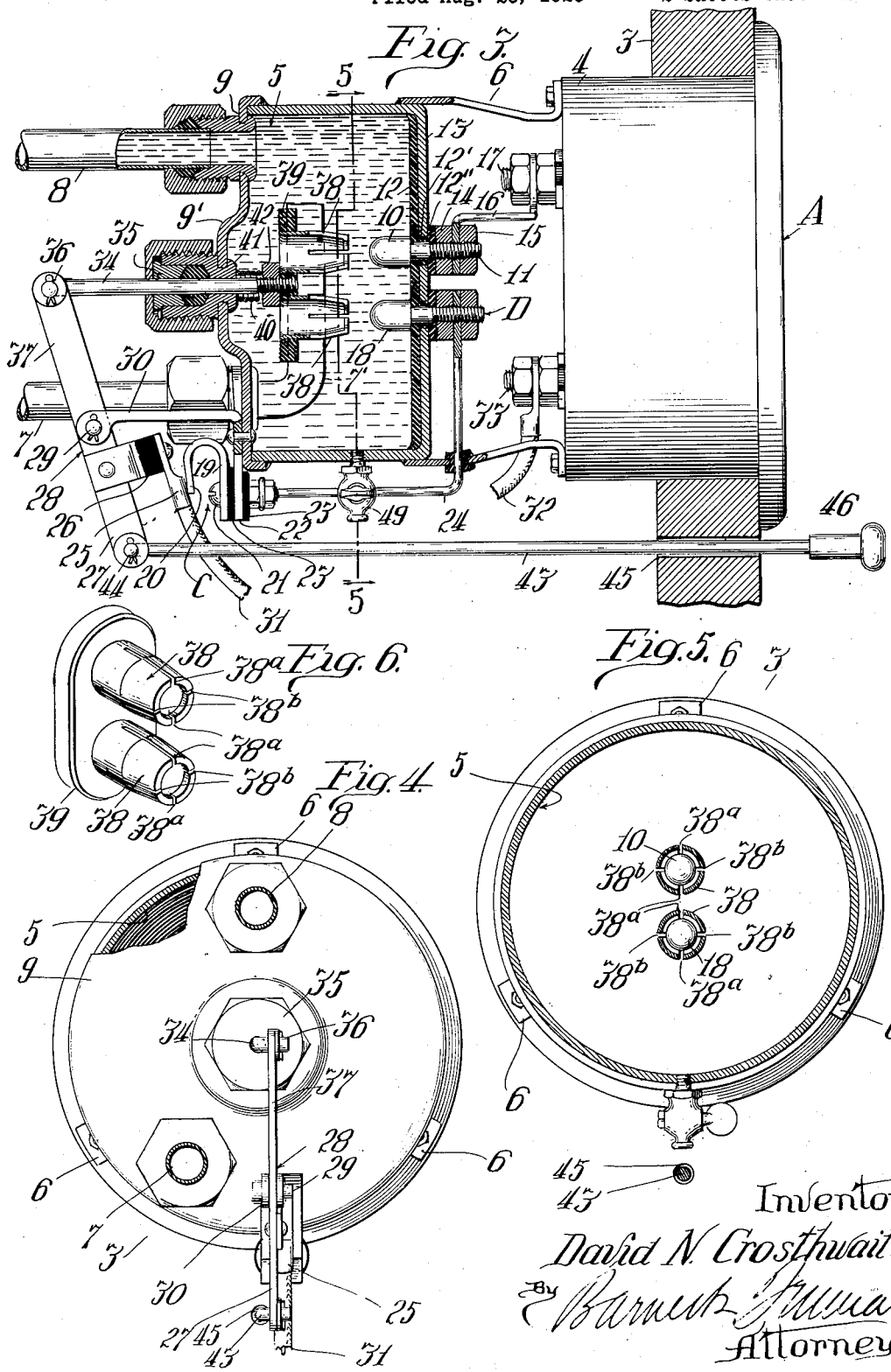

Patented Aug. 30, 1932

1,874,911

UNITED STATES PATENT OFFICE

DAVID N. CROSTHWAIT, JR., OF MARSHALLTOWN, IOWA, ASSIGNOR TO C. A. DUNHAM COMPANY, OF MARSHALLTOWN, IOWA, A CORPORATION OF IOWA

FREEZING TEMPERATURE INDICATOR

Application filed August 25, 1928. Serial No. 302,031.

This invention relates to a freezing temperature indicator, and more particularly to a device adapted for use on an automobile for instantly indicating, at any time, the temperature at which the liquid then in use in the motor-cooling system will freeze.

In most automobiles, and other devices where an internal combustion engine is used to supply the power, a circulating liquid (usually water) is used to maintain the cylinders at the desired temperature. In the winter this liquid is subjected to freezing temperatures when the motor is not running, or the liquid is not in circulation. It is customary, in the winter, to add certain substances, such as alcohol, to the water in order to prevent the liquid from freezing. Inasmuch as substances like alcohol vaporize at a lower temperature than the water, the alcohol content constantly diminishes. Heretofore, instruments such as an ordinary floating type of hydrometer have been used to determine the alcohol content or the freezing temperature of the liquid in the radiator. This method is inconvenient and inaccurate, since observations cannot be made while the motor vehicle is in motion, nor is the sample of the liquid in which the hydrometer is immersed, truly indicative of the average condition of the liquid in the cooling system.

The general object of this invention is to provide an instrument for this purpose that can be used on motor vehicles while they are in motion, that permits the observation to be taken on an average sample of the liquid in the cooling system, and that can be read directly with minimum effort by the operator. Briefly described, the device includes an indicating galvanometer, having its dial calibrated in freezing temperatures, the actuating circuit for the galvanometer being arranged to pass through a sample of the liquid. Since the resistance, or conductivity, of the liquid will vary in accordance with the proportion of alcohol or other anti-freeze substance therein, the galvanometer may be adjusted to indicate the temperature at which the liquid will freeze.

Another object is to provide an indicator for this purpose that may be mounted on the automobile dash or instrument panel.

Another object is to provide means for continuously circulating the liquid past the spaced electrodes in the operating circuit so that the operating current will always pass through a true average sample of the liquid.

Another object is to provide means for automatically cleaning the electrodes to remove chemical incrustations therefrom, thus maintaining the accuracy of the instrument.

Another object is to provide means for compensating for temperature changes in the liquid, which affect its conductivity.

Another object is to provide an instrument of this type that is simple and easy to install, and that is rugged and reliable when in service.

Other objects and advantages of the invention will be more apparent from the following detailed description of one approved form of the apparatus.

In the accompanying drawings:

Fig. 1 is a view showing the indicating instrument in front elevation, and showing the operating circuit diagrammatically.

Fig. 2 is a central vertical section through the apparatus, when not in use.

Fig. 3 is a view similar to Fig. 2 showing the position of the parts when an observation is being taken.

Fig. 4 is a rear elevation of the assembled device.

Fig. 5 is a transverse vertical section taken substantially on the line 5—5 of Fig. 3.

Fig. 6 is a perspective view of the scraping mechanism.

Referring first to Fig. 1, A designates the indicating instrument, B is a battery or other source of power, C is a manually operable switch, and D indicates a pair of electrodes mounted so as to project in spaced relation into the liquid that is to be tested. The instrument A encloses a galvanometer or similar electrical measuring device, which is connected in circuit with the battery B, electrodes D, and switch C, this circuit normally being open at the switch C. When the switch C is closed, a current will flow through the circuit, including the liquid between the terminals or electrodes D, and the strength of this current will be indicated by the galvanometer. The needle or pointer 1 of the galvanometer, which when no current is flowing occupies a neutral or inoperative position at the left as indicated in solid lines, is adapted when actuated to swing across the dial 2 which is calibrated in freezing temperatures, as indicated in Fig. 1. The dial is so graduated that if the electrodes D are immersed in pure water, and the circuit closed, the needle 1 will swing over to the point designated as 32° above zero.

The substances used to prevent the freezing of the cooling liquid used in internal combustion engines of motor vehicles, are usually alcohol, glycerin or calcium chloride, or similar substances, alcohol usually being used. In the case of alcohol or glycerin the resistance of the liquid to the conduction of an electric current increases as the amount of the anti-freezing liquid in the solution is increased. For example, if water is the usual cooling liquid and alcohol is added, the amount of current that will pass through the alcohol water mixture with a given potential decreases as the quantity of alcohol in solution increases. Supposing that alcohol is used, and the dial is properly calibrated as indicated in Fig. 1, as the percentage of alcohol is increased the resistance to the electric current will also increase and the consequent deflection of the galvanometer needle will be diminished, so that when switch C is closed the needle will only swing over to some intermediate position such as indicated for example in dotted lines. This position indicates that the mixture will freeze at 10° above zero. When the alcoholic content is increased, the swing of the needle will be further decreased so that a lower freezing point such as zero, or below zero will be indicated.

If other anti-freeze substances are used in the solution, a different calibration of the dial may be necessary. In the case of certain salts, such as calcium chloride for example, the addition of the salt increases the conductivity of the solution. Consequently the figures on the dial would be reversed from those indicated in Fig. 1. That is, the minimum current would flow, and consequently the deflection of the needle would be least, when pure water is used, and as the percentage of salt in solution is increased the conductivity will be increased and the needle will swing further over to the right. Obviously the same dial could be graduated in two or more different scales, so that the same instrument could be used with different anti-freeze solutions.

Referring now also to Figs. 2 to 6, inclusive, of the drawings, an embodiment of the device is illustrated suitable for installation in the dash or instrument panel 3 of an automobile. The casing 4 of the indicating instrument A is mounted in a suitable aperture in dash 3 in any suitable manner. This casing 4 houses the galvanometer or other equivalent electric measuring instrument, which may be of any suitable and well known type. In the following description, and in the claims, it is to be understood that the term "galvanometer" is intended to indicate any suitable type of electric measuring instrument adapted to actuate the pointer or needle 1. A closed receptacle or sampling chamber 5 is mounted on the rear wall of casing 4, in suitably spaced relation thereto, by means of brackets or spiders 6. An inlet pipe 7 is suitably connected with the lower portion of receptacle 5, and an outlet pipe 8 is similarly connected to the upper portion of the receptacle, in the example shown these pipes being suitably sealed into the rear wall 9 of the receptacle 5. The pipes or conduits 7 and 8 are included in the circulating system of the cooling liquid, so that as this liquid is circulating to and from the engine and radiator it will pass through receptacle or chamber 5 which will always inclose a sample of the cooling solution then in use in the automobile. In order to maintain a sample of the liquid within container 5 at all times, the inlet pipe 7 may be extended up within the container, as indicated at 7', or a suitable one-way check-valve can be placed in the pipe 7 to prevent liquid in casing 5 from flowing out through this pipe.

An electrode 10 which projects into the interior of chamber 5, has a threaded stem 11 which projects out through an insulating plate 12 covering the inner surface of the front wall 13 of chamber 5, and having an integral sleeve or thimble 12' projecting through the wall 13. The electrode is locked in place by the nut 14, mounted on threaded stem 11. An insulating washer 12" is mounted between nut 14 and the wall 13. A second nut 15 serves to connect a conductor 16 to the electrode, the other end of conductor 16 being connected to one terminal 17 on the galvanometer. A second electrode 18, similar to the electrode 10, is mounted in a similar manner in front wall 13 of receptacle 5 so that it will project into the receptacle in spaced relation to the electrode 10, but be insulated therefrom and also from the receptacle.

A fixed switch contact 19, having a return bent spring arm 20, is secured by bolt 21 to a bracket 22 projecting from receptacle 5, but insulated therefrom by suitable spools or disks of insulating material 23. A conductor 24 connects this switch contact 19 with the electrode 18. A movable switch contact 25 adapted to engage the spring arm 20 of fixed contact 19, is carried by an insulating block 26 mounted on the lower arm 27 of a lever 28 pivoted intermediately at 29 on a bracket arm 30 extending out from the receptacle 5. One lead 31 of the electric circuit connects with the movable switch contact 25, the other lead 32 connecting with the remaining galvanometer terminal 33.

A plunger 34, guided for sliding movement through a suitable packing or stuffing box 35 supported in the rearwardly bowed portion 9' of the rear wall 9 of receptacle 5 is pivoted at its outer end 36 to the upper arm 37 of the lever 28. The inner end of the plunger 34 carries a suitable scraping mechanism for removing chemical incrustations from the electrodes 10 and 18. This scraping mechanism comprises a pair of similar tubular members 38, the front ends of which are split at 38ᵃ and 38ᵇ to provide a plurality of spring fingers which slidingly and yieldingly engage the surface of the electrodes so as to scrape any desposits therefrom. The rear ends of these scrapers 38 are mounted in a block of insulating material 39 carried by the forward end of plunger 34. A compression spring 40 confined between the plunger guide 41 and a nut 42 on the plunger serves to normally urge the scraping mechanism forwardly to the position shown in Fig. 2. This spring will also, through the lever 28, serve to normally hold the switch contacts 20 and 25 apart, that is in circuit breaking position. A stem 43 is pivoted at its rear end 44 to the lower arm 27 of lever 28, and extends at its front end through a passage 45 in the dash 3, and carries in front of the dash a button or knob 46 by means of which the stem may be drawn out to the position shown in Fig. 3.

Operating button 46 will normally be back against the dash, as indicated in Fig. 2, with the switch contacts separated and no current flowing through the device. When a reading is to be taken, the operator pulls out the button 46 to the position shown in Fig. 3. This results in swinging lever 28 from the position shown in Fig. 2 to the position shown in Fig. 3, thereby withdrawing the scrapers 38 from the electrodes 10 and 18 and moving switch contact 25 into engagement with the fixed switch contact 20. The parts are so positioned that the scrapers 38 will be entirely withdrawn from the electrodes before the switch is closed. A circuit is now completed through the indicating galvanometer, the current flowing through the liquid in chamber 5 between the electrodes 10 and 18. The chemical constituency of this liquid will determine the resistance of that portion of the circuit between the electrodes 10 and 18, and thus determine the reading of the galvanometer needle on dial 2, as already described. As soon as the knob 46 is released, the spring 40 will automatically return the parts to the inoperative position shown in Fig. 2, thus breaking the circuit at the switch and returning the scrapers to a position over the electrodes. The solution of cooling liquid flows continuously through the chamber 5 when the motor is in operation so that a fair sample of this liquid for testing purposes is always present in the receptacle 5. This forced circulation through the chamber 5 has the advantage of preventing partial separation of the constituents of the solution at the time of observation, and also of maintaining a reasonably constant temperature for the solution in the chamber. Since the contacts are closed only when it is desired to make an observation, the deposit of gases on the electrodes as the result of decomposition by the current is practically done away with, and more accurate readings are secured. Also the relatively slow motion of the liquid through the expanded conduit (container 5) helps to reduce possible errors in the observations.

As is well known, the electrical resistance of certain liquids varies with the temperature of the liquid. Accordingly, in order to increase the accuracy of the instrument, means should be provided to compensate for this change in resistance resulting in changes in temperature. One method of accomplishing this result is to make a portion of the needle or pointer 1 in the form of a bi-metallic bar, as indicated at 47 and 48 in Fig. 1, the needle warping in response to temperature changes and thus varying the reading on the dial 2. An alternative method would be to use bi-metallic strips for mounting the electrodes, so that the distance therebetween would be varied as the temperature changed. The material of which the sampling chamber 5 is constructed could be so selected that its contraction with reduction in temperature would reduce the space intervening between the electrodes sufficiently to compensate for the variation (which is usually a reduction) in the conductivity of the solution.

The casing or receptacle 5 might be made of glass or other suitable dielectric material, in which case the insulating members such as 12, used for mounting electric conductors thereon, could be omitted. The pipes 7 and 8 might likewise be made of dielectric material.

Suitable cutoff valves in the pipes 7 and 8, and a shunt connection between these pipes can be provided so that the flow of the liquid through this device can be discontinued in summer weather. At such times the container 5 may be drained of its contents by opening drain cock 49 in the bottom of the casing.

While a preferred form of means for mounting the spaced electrodes has been disclosed, it will be obvious that these electrodes could be mounted within the circulating liquid in other ways without departing from the broad principles of this invention. For example, these electrodes might be suitably mounted in one of the hose connections, such as the hose connecting the bottom of the radiator with the pump. Since the only absolutely essential connections between these immersed electrodes and the indicating instrument are electric wires, the relative locations of these parts of the apparatus and the distance therebetween are of no great importance.

While one approved form of mechanism for carrying out the principles of this invention has been described and shown, numerous variations and equivalent constructions could be used without departing from the principles of the invention as first outlined, and as specified in the claims which follow.

I claim:

1. A device for indicating the freezing temperature of a liquid, comprising a dial calibrated in freezing temperatures, and a relatively movable pointer cooperating therewith, electrically operated means for causing relative movement between the dial and the pointer, a receptacle for the liquid, a pair of electrodes insulated from the receptacle and projecting in spaced relation into the liquid, an electric circuit including the operating means and the electrodes, a switch for closing the circuit when a reading of the indicator is desired, movable scrapers for cleaning the electrodes, and means for successively moving the scrapers from the electrodes and closing the switch.

2. A device for indicating the freezing temperature of a liquid, comprising a galvanometer including a movable needle and a fixed dial calibrated in freezing temperatures, a receptacle for holding a sample of the liquid, a pair of spaced electrodes mounted within the receptacle and insulated therefrom, an electric circuit including the galvanometer and the electrodes, a switch for closing the circuit when a reading of the indicator is desired, movable scrapers mounted within the receptacle for cleaning the electrodes, and means connected with the switch and scrapers so that the scrapers will be withdrawn from the electrodes before the switch is closed.

3. A device for indicating the freezing temperature of a liquid comprising an indicating galvanometer, calibrated in freezing temperatures, and including a casing adapted to be mounted in an automobile instrument board, a closed receptacle mounted on the rear of the galvanometer casing, a pair of electrodes mounted in one wall of the receptacle but insulated therefrom, the electrodes projecting in spaced relation into the interior of the receptacle, a conductor joining one terminal of the galvanometer with one of the electrodes, an inlet conduit for the liquid connected with the lower portion of the receptacle, an outlet conduit connected with the upper portion of the receptacle, a fixed switch contact mounted on the receptacle but insulated therefrom, a conductor joining this contact with the other electrode, a movable switch contact, means operable from the instrument board for moving the movable contact into or out of engagement with the fixed contact, and electric power lines connected with the movable switch contact and the remaining galvanometer terminal.

4. A device for indicating the freezing temperature of a liquid comprising an indicating galvanometer, calibrated in freezing temperatures, and including a casing adapted to be mounted in an automobile instrument board, a closed receptacle mounted on the rear of the galvanometer casing, a pair of electrodes mounted in one wall of the receptacle but insulated therefrom, the electrodes projecting in spaced relation into the interior of the receptacle, a conductor joining one terminal of the galvanometer with one of the electrodes, an inlet conduit for the liquid connected with the lower portion of the receptacle, an outlet conduit connected with the upper portion of the receptacle, a fixed switch contact mounted on the receptacle but insulated therefrom, a conductor joining this contact with the other electrode, a lever intermediately pivoted to the receptacle casing, a movable switch contact carried by one arm of the lever, means operable from the instrument board for swinging the lever to bring the switch contacts into engagement, electric power lines connected with the movable switch contact and the remaining galvanometer terminal, a plunger slidable through the wall of the receptacle opposite the electrodes, the outer end of the plunger being connected to the second arm of the lever, and a pair of scrapers carried by the inner end of the plunger for engaging the respective electrodes.

5. A device for indicating the freezing temperature of a liquid comprising an indicating galvanometer, calibrated in freezing temperatures, and including a casing adapted to be mounted in an automobile instrument board, a closed receptacle mounted on the rear of the galvanometer casing, a pair of electrodes mounted in one wall of the receptacle but insulated therefrom, the electrodes projecting in spaced relation into the interior of the receptacle, a conductor joining one terminal of the galvanometer with one of the electrodes, an inlet conduit for the liquid connected with the lower portion of the receptacle, an outlet conduit connected with the upper portion of the receptacle, a fixed switch contact mounted on the receptacle but insulated therefrom, a conductor joining this contact with the other electrode, a lever intermediately pivoted to the receptacle casing, a movable switch contact carried by one arm of the lever, means operable from the instrument board for swinging the lever to bring the switch contacts into engagement, electric power lines connected with the movable switch contact and the remaining galvanometer terminal, a plunger slidable through the wall of the receptacle opposite the electrodes, the outer end of the plunger being connected to the second arm of the lever, a pair of scrapers carried by the inner end of the plunger for engaging the respective electrodes, and a spring for normally moving the scrapers into engagement with the electrodes and separating the switch contacts.

DAVID N. CROSTHWAIT, Jr.